United States Patent
Ohnuma

[11] Patent Number: 6,118,896
[45] Date of Patent: *Sep. 12, 2000

[54] IMAGE PROCESSING APPARATUS AND METHOD FOR PERFORMING COLOR CORRECTION BASED ON OBJECT TYPE OF AN IMAGE

[75] Inventor: Nubuo Ohnuma, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/688,953

[22] Filed: Jul. 31, 1996

[30] Foreign Application Priority Data

Jul. 31, 1995 [JP] Japan ................................ 7-195239

[51] Int. Cl.[7] .................................................. H04N 1/60
[52] U.S. Cl. .......................... 382/167; 358/520; 358/521; 358/529
[58] Field of Search .................................. 358/518–521, 358/528–529, 451, 462, 464, 501–503, 1.9; 382/167, 298, 164, 165; H04N 1/60

[56] References Cited

U.S. PATENT DOCUMENTS

| | | |
|---|---|---|
| 4,985,759 | 1/1991 | Ito .......................................... 358/529 |
| 4,989,079 | 1/1991 | Ito .......................................... 358/520 |
| 5,060,060 | 10/1991 | Udagawa et al. . |
| 5,357,353 | 10/1994 | Hirota .................................... 358/518 |
| 5,398,124 | 3/1995 | Hirota .................................... 358/518 |
| 5,539,523 | 7/1996 | Nakai et al. ............................ 358/518 |
| 5,687,006 | 11/1997 | Namizuka et al. ..................... 358/462 |
| 5,742,440 | 4/1998 | Suzuki . |
| 5,905,579 | 5/1999 | Katayama et al. ..................... 358/464 |

*Primary Examiner*—Kim Yen Vu
*Attorney, Agent, or Firm*—Fitzpatrick, Cella, Harper & Scinto

[57] ABSTRACT

A color correction unit for natural images, graphics and characters performs color correction of enlarging regions corresponding to primary colors (R (red), G (green) and B (blue)) and secondary colors (C, M and Y) while maintaining gray balance for R0, G0 and B0 raster image data representing an input object image, to generate C1, M1, Y1 and K1 multivalue density data. A binary-coding processing unit performs binary-coding processing of the C1, M1, Y1 and K1 multivalue density data to generate C2, M2, Y2 and K2 binary density data, and transfers the generated density data to a printer using a centroparallel interface or the like.

7 Claims, 6 Drawing Sheets

R,G,B(255,0,0)

R,G,B(0,255,0)

R,G,B(255,0,255)

IMAGE PROCESSING APPARATUS AND METHOD FOR PERFORMING COLOR CORRECTION BASED ON OBJECT TYPE OF AN IMAGE

BACKGROUND OF THE INVENTION

1. Field of the Invention

The invention relates to an image processing apparatus and method, and more particularly, to an image processing apparatus and method in which color processing is performed.

2. Description of the Related Art

In a color printer which inputs R (red), G (green) and B (blue) signals, or C (cyan), M (magenta) and Y (yellow) signals or C, M, Y and K (black) signals, serving as complementary-color signals of the R, G and B signals, and which prints an image in colors corresponding to the input signals with ink or toner having C, M and Y, or C, M, Y and K colors, in order to print a blue color, a cyan (C) component having a density of 100% and a magenta (M) component having a density of 100% are superposed.

Such a technique, however, has the following problems.

That is, in a binary color printing processing apparatus, binary-coding processing, such as dither processing, density diffusion processing or the like, is performed for multivalue density data comprising a plurality of color components. In this processing, each of a plurality of color components is convereted to binary density data by being compared with a predetermined threshold. Hence, in the above-described printing method, a high-density image is, in some cases, formed for a low-density portion.

Accordingly, in primary-color and secondary-color regions (R, G, B, C, M and Y regions) where the level of certain color component data is lower than the levels of color component data in the vicinity thereof, the color component whose level must be low is output with a high level in a color different from the colors of adjacent pixels in a part of the image. Hence, the color output with a high level is pronounced with respect to colors of adjacent pixels which are reproduced in an excellent state. As a result, a grainy image is produced.

Furthermore, when an ideal subtractive color mixture cannot be performed, a color obtained by mixing 100% cyan and magenta differs from the expected blue, and is output in a color tending to purple.

SUMMARY OF THE INVENTION

The present invention has been made in consideration of the above-described problems.

It is an object of the present invention to prevent mixture of different colors and to perform color correct in order to form a high-quality image when reproducing a color close to a pure color.

It is another object of the present invention to provide an image processing apparatus and method which can perform high-quality color correction of image data within a predetermined hue range.

It is still another object of the present invention to perform high-quality color correction of image data within a predetermined hue range when preventing mixture of different colors when reproducing a color close to a pure color.

According to one aspect, the present invention which achieves these objectives relates to an image processing apparatus having input means for inputting image data representing an object image, color correction means for performing color correction of enlarging regions in a color space corresponding to primary colors and secondary colors for the input image data, and output means for outputting the image data subjected to the color correction.

According to another aspect, the present invention which achieves these objectives relates to an image processing apparatus having input means for inputting image data including a plurality of color component data representing an object image, determination means for determining if the input image data is within a predetermined hue range, and color correction means for performing color correction of predetermined color component data when the input image data has been determined to be within the predetermined hue range.

According to still another aspect, the present invention which achieves these objectives relates to an image processing apparatus having input means for inputting image data representing an object image, pure-color-region enlarging color correction means for enlarging pure-color regions for the input image data, and predetermined-hue-range color correction means for performing color correction of data within a predetermined hue range.

According to still another aspect, the present invention which achieves these objectives relates to an image processing method having the steps of inputting image data representing an object image, performing color correction of enlarging regions in a color space corresponding to primary colors and secondary colors for the input image data, and outputting the image data subjected to the color correction.

According to still another aspect, the present invention which achieves these objectives relates to an image processing method having the steps of inputting image data comprising a plurality of color component data representing an object image, determining if the input image data is within a predetermined hue range, and performing color correction of predetermined color component data when the input image data has been determined to be within the predetermined hue range.

According to still another aspect, the present invention which achieves these objectives relates to an image processing method having the steps of inputting image data representing an object image, enlarging pure-color regions for the input image data, and performing color correction of data within a predetermined hue range.

The foregoing and other objects, advantages and features of the present invention will become more apparent from the following description of the preferred embodiments taken in conjunction with the accompanying drawings.

DESCRIPTION OF THE PREFERRED EMBODIMENTS

An image processing apparatus according to an embodiment of the present invention will now be described in detail with reference to the drawings.

Configuration

Figure 1:
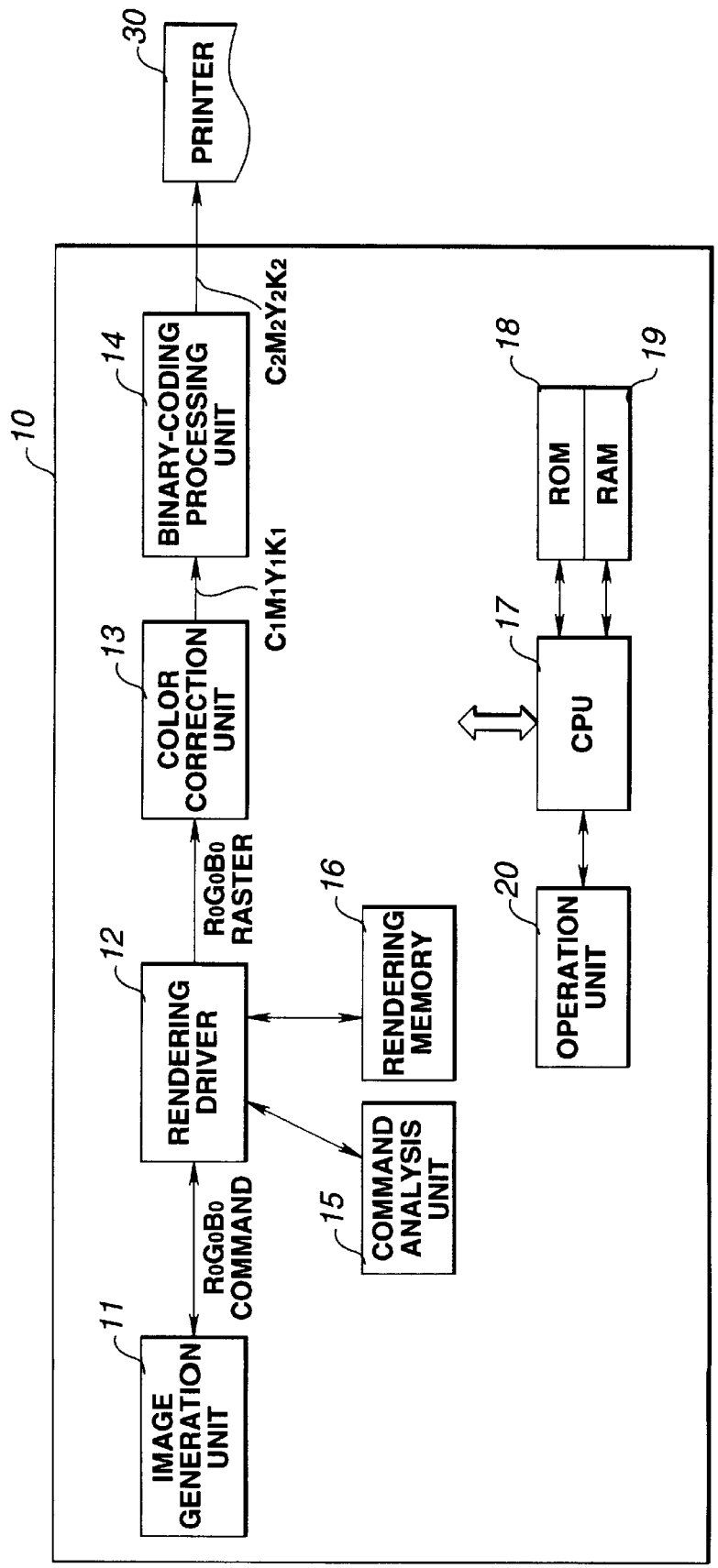
FIG. 1 is a block diagram illustrating the configuration of an image processing system according to an embodiment of the present invention.

FIG. 1 is a block diagram illustrating the configuration of an image processing system according to the embodiment of the invention.

The image processing system of the embodiment is mainly configured by a host apparatus 10 for performing image processing, and a printer 30 for forming an image based on binary data. In accordance with a user's application, various apparatuses, such as a scanner and the like, may also be added. An electrophotographic full-color printer may be used as the printer 30.

Figure 5A:
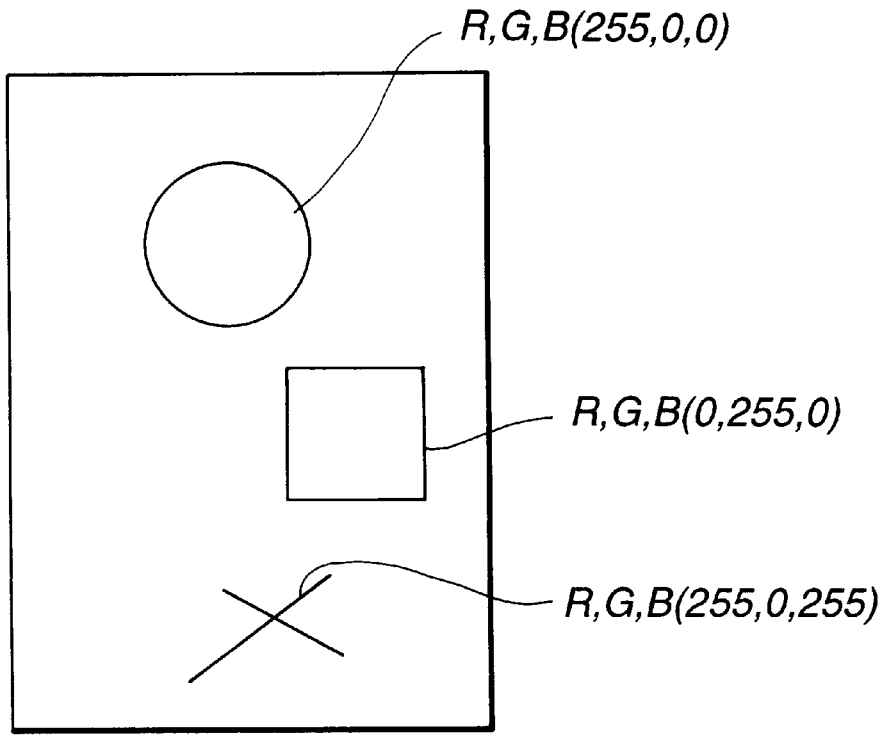
FIG. 5A is a diagram illustrating an input image.
Figure 5B:
FIG. 5B is a diagram illustrating another input image.

An image generation unit 11 of the host apparatus 10 generates R0, G0 and B0 command image data, obtained by combining color assigning commands comprising 8 bits for each of R, G and B colors and drawing commands, for, for example, graphics, as shown in FIG. 5A, formed by an application program operating in the host apparatus 10, or a photograph (a natural image), as shown in FIG. 5B, input from an image input apparatus, such as a scanner or the like, connected to the host apparatus 10.

A rendering driver 12 analyzes the commands of R0, G0 and B0 command image data using a command analysis unit 15, performs rendering of the R0, G0 and B0 command image data in a rendering memory 16, and generates R0, G0 and B0 raster image data, serving as raster data.

A color correction unit 13 performs color correction of each of the R0, G0 and B0 raster image data based on the user's instructions through an operation unit 20, and generates C1, M1, Y1 and K1 multivalue density data.

A binary-coding processing unit 14 performs binary-coding processing of the C1, M1, Y1 and K1 multivalue density data to generate C2, M2, Y2 and K2 binary density data, and transfers the generated data to the printer 30 using a centroparallel I/F (interface) or the like.

The above-described respective units are controlled by a CPU (central processing unit) 17, which uses a RAM (random access memory) 19 as a working memory, based on programs stored in a ROM (read-only memory) 18. The CPU 17 controls color correction of the color correction unit 13 based on instructions which are manually set by the user using the operation unit 20.

The printer 30 forms an image on a recording medium using heads corresponding to respective C, M, Y and K colors which discharge liquid droplets by producing film boiling using thermal energy based on the C2, M2, Y2 and K2 binary density data transferred from the host apparatus 10.

Color Correction

Figure 2:
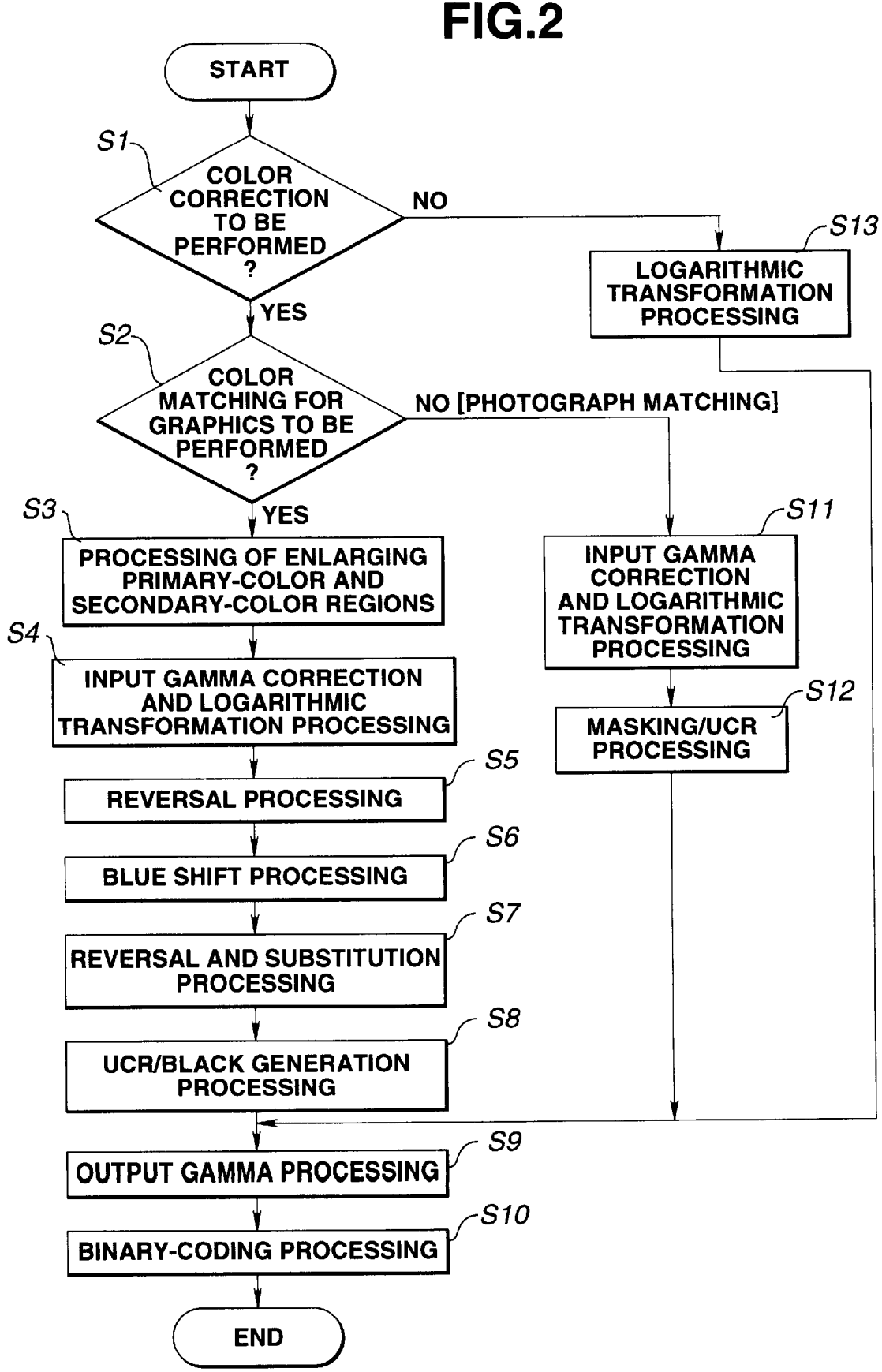
FIG. 2 is a flowchart of the color correction performed by the color correction unit 13 of FIG. 1.

FIG. 2 is a flowchart illustrating color correction performed by the color correction unit 13.

In the present embodiment, the following three types of images are mainly processed.

(1) Photographs: i.e., natural images. A photograph has the characteristics that boundaries between gradation steps are less distinct and the number of colors included within an image is very large.

(2) Graphics: i.e., figures, graphs, illustrations, and images having distinct colors and contour lines which are formed by graphics-type application software. A graphics image has the characteristics that clear colors are present and boundaries between colors are distinct compared with a photograph (a natural image).

(3) Characters: A character has the characteristic that edges are emphasized.

As described above, each type of image has entirely different characteristics. Accordingly, the color correction unit 13 performs color correction in accordance with the characteristics of each image in order to perform color matching between the input image and the output image formed by the printer 30 based on the appearance of colors.

In FIG. 2, in steps S1 and S2, instructions by the user are determined through the operation unit 20. In step S1, it is determined if color correction is to be performed. In step S2, it is determined if color matching (color correction) for graphics is to be performed. Based on combinations of the determinations in steps S1 and S2, optimum color correction is selected from among the following three kinds of color correction:

graphics matching, photograph matching, and no color correction.

Graphics Matching

When graphics matching is selected, first, processing of enlarging regions in a color space corresponding to primary colors and secondary colors (i.e., regions of the six elementary colors, R, G, B, C, M and Y) is performed for the input R0, G0 and B0 raster image data (step S3). The processing of enlarging the primary-color and secondary-color regions is performed using the following expressions (1):

$$\begin{cases} R2 = A11R0 + A12G1 + A13B1 \\ G2 = A21R0 + A22G1 + A23B1 \\ B2 = A31R0 + A32G1 + A33B1. \end{cases} \quad (1)$$

At that time, the values of respective coefficients are set based on the following expression (2) in order to maintain gray balance:

$$A11 = A22 = A33. \quad (2)$$

In order to enlarge primary-color and secondary-color regions, the coefficients Amm (m=1–3) are set to values which are larger than ordinary values (for example, at least 1.00), and the amounts obtained by increasing the coefficients Amm are reduced by Amn (m=1–3, n=1–3, and m≠n) in order to maintain gray balance. The values R2, G2 and B2 obtained by the matrix calculation are clipped to 255 levels.

Figure 3:
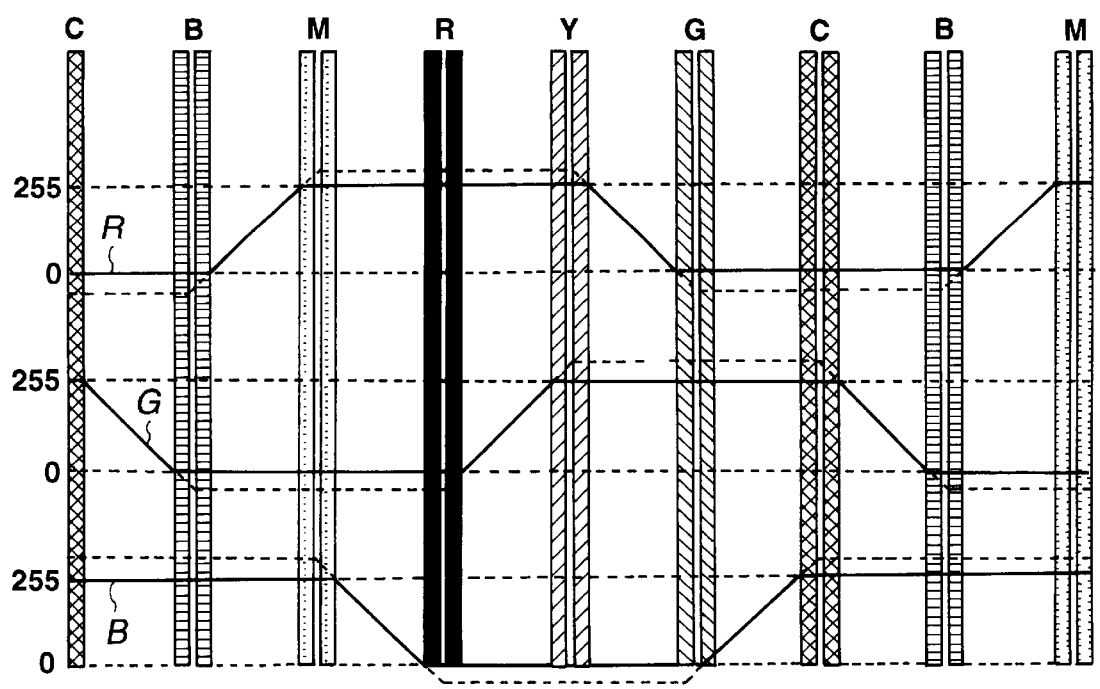
FIG. 3 is a diagram illustrating a result of region enlarging processing.

FIG. 3 is a diagram illustrating a result of processing of enlarging primary-color and secondary-color regions. In FIG. 3, the abscissa represents hue. Accordingly, C→B→M→R→Y→G→C indicates a hue circle, which is repeated thereafter.

That is, a region having a hue close to the hue of one of the primary and secondary colors R, G, B, C, M and Y is dealt with as the corresponding pure color, R, G, B, C, M or Y. FIG. 3 illustrates the relationship between the data of respective R2, G2 and B2 colors obtained as a result of processing of enlarging the primary-color and secondary-color regions, and the hue. Accordingly, the above-described problem that, when reproducing a color close to a pure color, different colors are mixed to provide a very pronounced region is solved, and a high-quality image can be formed by the printer 30 based on data subjected to binary-coding processing.

The matrix coefficients (A11–A33) used for processing of enlarging the primary-color and secondary-color regions are set so as to enlarge the primary and secondary colors, faithfully reproduce achromatic colors, and maintain gray balance for holding the recording density. Accordingly, color correction can be performed based on two points, i.e., maintenance of gray balance which is most important when reproducing a graphics image by a printer, and reproduction of an image in clear colors.

Then, the R2, G2 and B2 luminance data subjected to the processing of enlarging the primary-color and secondary-color regions are subjected to input gamma correction and logarithmic transformation processing based on the following expressions (3), to obtain C1, M1 and Y1 density data (step S4):

$$\begin{cases} C1 = \log[\text{input gamma } R(R2)] \\ M1 = \log[\text{input gamma } G(G2)] \\ Y1 = \log[\text{input gamma } B(B2)], \end{cases} \quad (3)$$

where the base of the logarithmic calculation is 10.

According to the above-described input gamma correction and logarithmic transformation processing, it is possible to correct input characteristics of input image data, and to perform luminance-density conversion corresponding to characteristics of the visual senses.

Then, the C1, M1 and Y1 density data are subjected to reversal processing based on the following expression (4) in order to prepare for blue shift processing, to obtain R3, G3 and B3 luminance data (step S5). Then, the R3, G3 and B3 luminance data are subjected to blue shift processing based on expression (4) (step S6).

If (B3>R3 and B3>G3)

$$\begin{cases} \text{if } (G3 \geq R3) & G4 = G3 + (B3 - G3) \cdot k1 \\ \text{else} & G4 = G3 + (B3 - R3) \cdot k2, \end{cases} \quad (4)$$

where k1 and k2 are constants.

That is, the first conditional sentence controls so that blue shift processing is performed only for blue regions (C-M regions), serving as predetermined regions. The next conditional sentence divides the predetermined region into two regions, i.e., a C-B region and a B-M region, and performs processing suitable for each of the regions. After passing through the first conditional sentence, the value of G4 is larger than the value of G3. By thus increasing the amount of the G component, the amount of M, serving as a complementary color, is reduced. As a result, blue approaches the hue of C.

The blue shift processing is performed in order to solve the problem that clear blue of an input image cannot be faithfully reproduced due to a difference in the color reproducing range between the input image and the printer, and therefore the color tone changes. More specifically, the problem that, when forming clear blue by the printer 30, blue purple is provided because the recording material for M is strong, and therefore a difference in the appearance of colors is present between the input image and the output image is solved.

Figure 4:
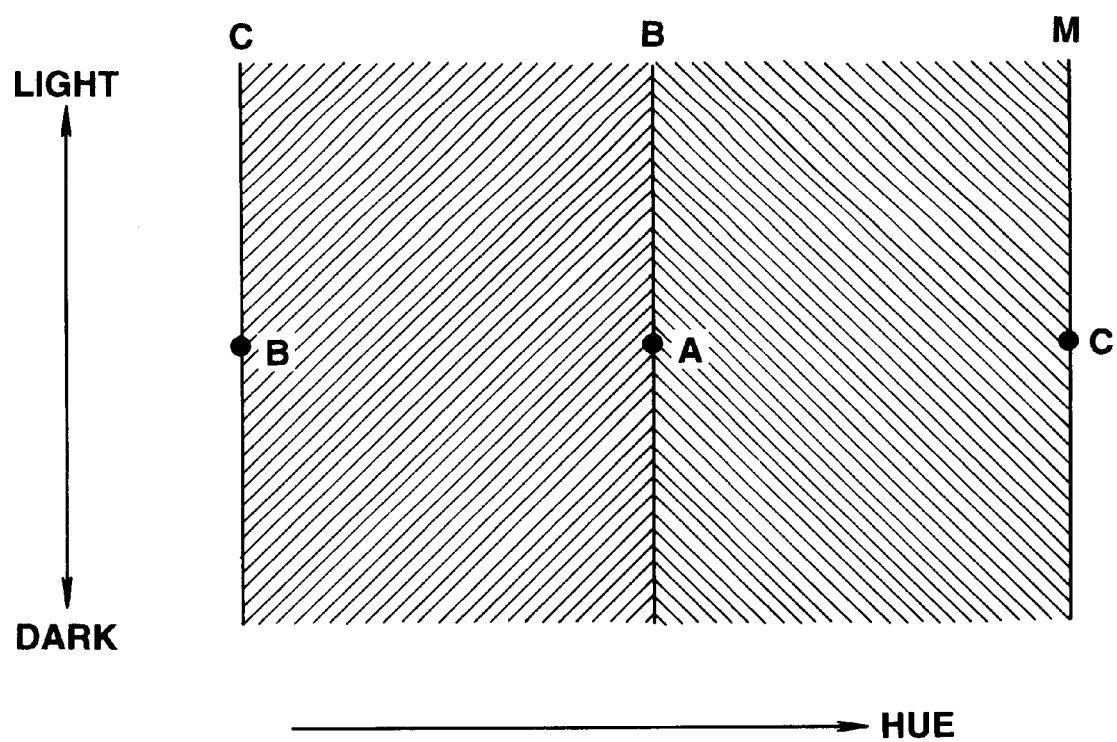
FIG. 4 is a diagram illustrating a result of blue shift processing.

That is, in image formation in a blue region (C-M region) as shown in FIG. 4, blue shift processing to reduce the amount of M is performed. The blue shift processing in step S4 is performed only for B4, serving as a complementary color of M1, by performing reversal processing in step S5. Furthermore, by performing input gamma correction and logarithmic transformation processing in advance in step S4, it is possible to perform processing corresponding to characteristics of the visual senses.

According to the above-described blue shift processing of the present embodiment, the following effects can be obtained.

(a) Colors can be smoothly changed for C-M regions.

(b) An arbitrary amount of the M component used in image formation can be reduced from pure blue indicated by a point A.

(c) A point B can be reproduced by pure cyan.

(d) A point C can be reproduced by pure magenta.

(e) Since blue shift processing is performed in an RGB color space based on the R, G and B luminance data, high-speed processing can be easily performed.

Then, the R3, G4 and B3 luminance data obtained by the blue shift processing are subjected to reversal processing and substitution processing to obtain C1, M2 and Y1 density data (step S7). Then, UCR/black generation processing is performed for the C1, M2 and Y1 density data to obtain C3, M3, Y3 and K3 density data (step S8). Then, the C3, M3, Y3 and K3 density data are subjected to output gamma correction processing to obtain C4, M4, Y4 and K4 density data (step S9). Then, the C4, M4, Y4 and K4 density data are subjected to binary-coding processing, and the resultant data are transferred to the printer 30 (step S10).

According to the above-described graphics matching processing, blue shift processing is performed while performing processing of enlarging the primary-color and secondary-color regions. Hence, clear colors in graphics can be reproduced with high quality without mixing other colors. Particularly, color matching based on the appearance of respective colors can be performed for reproduction of blue, which is a problem when using the conventional approach.

Photograph Matching

When photograph matching is selected, the same input gamma correction and logarithmic transformation processing as in step S4 is performed (step S11). Then, masking/UCR processing is performed for all color image data using the masking coefficients based on the output characteristics of the output printer (step S12). Then, output gamma processing is performed (step S9).

Since the same processing is performed for the entire region of a hue circle, continuity (i.e., gradation) between pixels in an image can be excellently reproduced.

No Color Correction

When "no color correction" has been selected, logarithmic transformation processing is performed (step S13). Then, output gamma processing is performed (step S9). For a character image for which the color tone is not significantly required, the throughput of processing is increased by performing processing in a mode of no color correction.

According to the above-described processing for each mode, appropriate color processing can be performed in accordance with the characteristics of each image.

In the present embodiment, the processing speed when color correction is performed differs from the processing speed when color correction is not performed, because the contents of processing differ. Accordingly, when the user prefers high-speed processing to the quality of colors in the formed image, the mode of no color correction may be selected. That is, according to the present embodiment, appropriate processing can be performed in accordance with the user's desire, based on processing speed.

Other Embodiments

The objects of the present invention may, of course, be achieved by supplying a system or an apparatus with a storage medium in which program code of software for realizing the functions of the above-described embodiment are stored, and reading and executing the program code stored in the recording medium by the computer (or the CPU or the MPU) of the system or the apparatus. In this case, the program code itself reads from the storage medium to realize the new functions of the present invention, and the storage medium which stores the program code constitutes the present invention. A floppy disk, a hard disk, an optical disk, a magnetooptical disk, a CD (compact disc)-ROM, a CD-R (recordable), a magnetic tape, a nonvolatile memory card, a ROM or the like may be used as the storage medium for supplying the program code.

Figure 6:
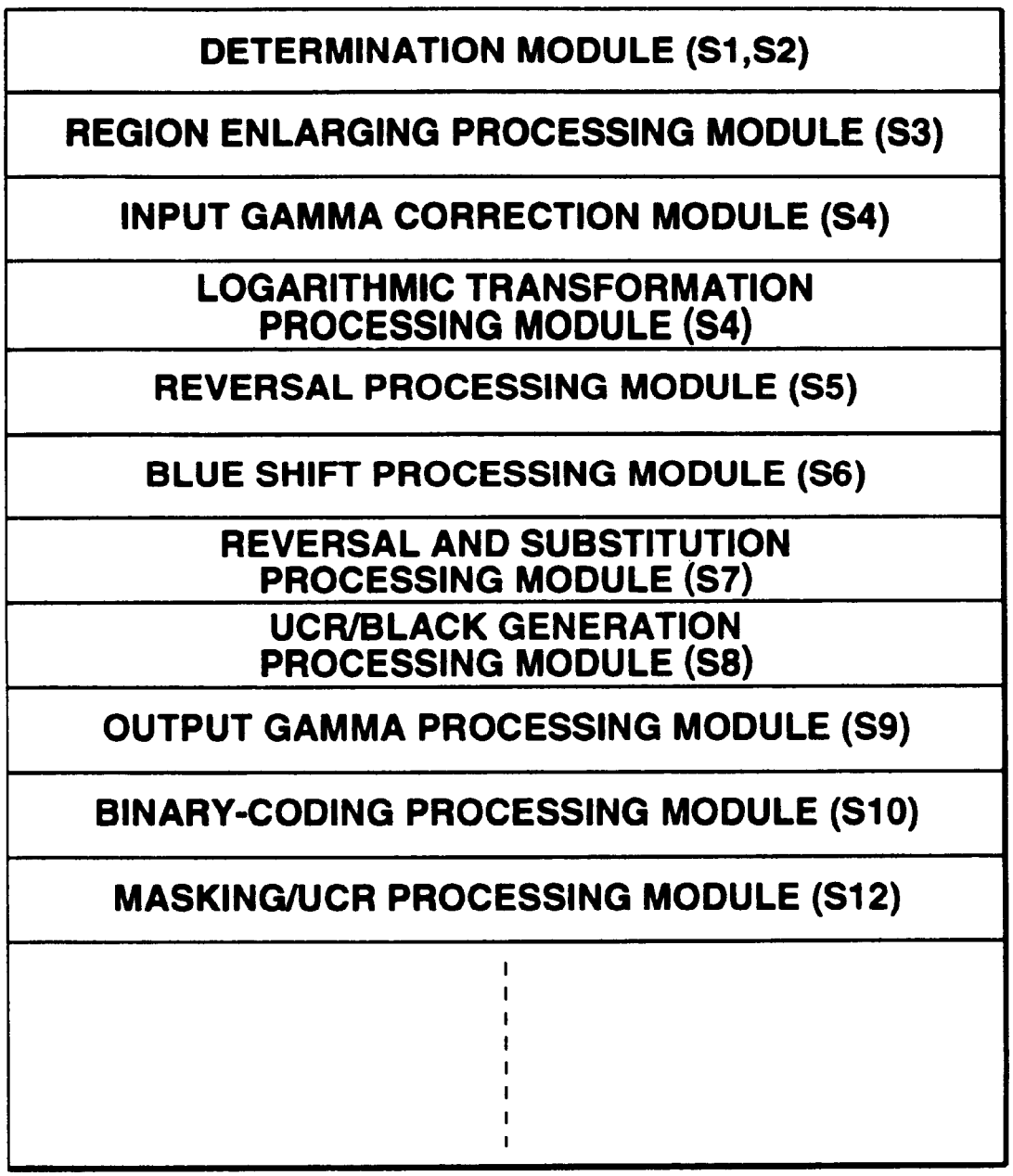
FIG. 6 is a diagram illustrating a memory map of a storage medium which stores program codes according to another embodiment of the present invention.

FIG. 6 is a diagram illustrating a memory map of a storage medium which stores such program code according to the present invention. In FIG. 6, symbols provided for respective modules correspond to the step numbers shown in FIG. 2.

In addition to the case of realizing the functions of the above-described embodiments by executing program code read by the computer, the present invention includes, of course, a case in which the functions of the above-described embodiments are realized by performing at least a part of the actual processing by an OS (operating system) or the like operating in the computer based on instructions of the program code.

The processing in the above-described embodiments may be performed by calculation based on the above-described expressions, or may be performed using a table storing the correspondence between input data and output data which has been obtained in advance by calcuation.

As described above, according to the foregoing embodiments, when reproducing a color close to a pure color, it is possible to prevent mixture of different colors, and to perform color correction in order to form a high-quality image.

Furthermore, it is possible to provide an image processing apparatus and method in which image data within a predetermined hue range is subjected to color correction with high quality.

In addition, when reproducing a color close to a pure color, image data within a predetermined hue range can be subjected to color correction with high quality when mixture of different colors is prevented.

The individual components designated by blocks in the drawings are all well known in the image processing apparatus and method arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus to be applied to an image forming apparatus which forms an image using plural colorants comprising:

input means for inputting image data representing an object image;

determining means for determining a type of the object image; and color correction means for performing color correction according to the type of the object image determined by said determining means, wherein said color correction means performs color corrected so as to enlarge a primary color region of a color space when the type of the object image is determined to be graphics by said determining means, the primary color region being a color region of a color space in which the image is formed by one colorant among the plural colorants.

2. An image processing apparatus according to claim 1, wherein said plural colorants comprise yellow, magenta and cyan.

3. An image processing apparatus according to claim 1, wherein said color correction means clips to a predetermined value data obtained by matrix calculation processing.

4. An image processing apparatus according to claim 1, wherein said color correction means maintains gray balance of the input image data.

5. An image processing apparatus according to claim 1, wherein said determination means determines the type of the object image on the basis of drawing commands representing the object image.

6. An image processing method to be applied to an image forming apparatus which forms an image using plural colorants comprising the steps of:

inputting data representing an object image;

determining a type of the object image; and performing color correction according to the type of the object image determined by said determining step, wherein said color correction step performs color correction so as to enlarge a primary color region of a color space when the type of the object means is determined to be graphics by said determining step, the primary color region being a color region of a color space in which the image is formed by one colorant among the plural colorants.

7. An image processing apparatus according to claim 1, wherein said determination means determines the type of the object image according to a manual instruction.

* * * * *

UNITED STATES PATENT AND TRADEMARK OFFICE
CERTIFICATE OF CORRECTION

PATENT NO.      : 6,118,896                                         Page 1 of 1
DATED           : September 12, 2000
INVENTOR(S)     : Nobuo Ohnuma It is certified that error appears in the above-identified patent and that said Letters Patent is hereby corrected as shown below:

Title page,
Item [75] Inventor, "Nubuo Ohnuma," should read -- Nobuo Ohnuma, --; and
Item [56] References Cited, under U.S PATENT DOCUMENTS "5,742,440" should read -- 5,742,410 --.

Column 1,
Line 47, "to" should read -- to be --; and
Line 53, "correct" should read -- correction --.

Column 3,
Line 21, "commands, for," should read -- commands for, --.

Column 7,
Line 30, "calcuation" should read -- calculation --.

Column 8,
Line 17, "rected" should read -- rection --.

Signed and Sealed this

Twenty-eighth Day of May, 2002

Attest:

JAMES E. ROGAN
*Attesting Officer*                *Director of the United States Patent and Trademark Office*